United States Patent
Schwert et al.

[11] Patent Number: 6,053,211
[45] Date of Patent: Apr. 25, 2000

[54] METHOD FOR THE COATING OF SEWER PIPES INCLUDING APPARATUS FOR CARRYING OUT THE METHOD

[75] Inventors: Siegfried Schwert; Wolf Rabold, both of Berlin, Germany

[73] Assignee: Karl Weiss hoch- tief- und Rohrleitungsbau GmbH & Co., Germany

[21] Appl. No.: 09/151,938

[22] Filed: Sep. 11, 1998

[51] Int. Cl.[7] ........................................... F16L 55/16
[52] U.S. Cl. ............................ 138/98; 138/97; 264/269; 264/36.1; 156/294
[58] Field of Search ..................... 138/98, 97; 264/269, 264/36.1; 156/294

[56] References Cited

U.S. PATENT DOCUMENTS

| | | | |
|---|---|---|---|
| 4,752,511 | 6/1988 | Driver | 138/98 X |
| 4,778,553 | 10/1988 | Wood | 138/98 X |
| 4,883,557 | 11/1989 | Morinaga et al. | 138/98 X |
| 5,265,648 | 11/1993 | Lyon | 138/98 |
| 5,397,513 | 3/1995 | Steketee, Jr. | 138/98 X |
| 5,634,743 | 6/1997 | Chandler | 138/98 X |
| 5,680,885 | 10/1997 | Catallo | 138/98 |
| 5,924,455 | 7/1999 | Jo et al. | 138/98 X |
| 5,937,910 | 8/1999 | Chandler | 138/98 X |

*Primary Examiner*—Patrick Brinson
*Attorney, Agent, or Firm*—Locke Reynolds LLP

[57] ABSTRACT

A method as well as a respective apparatus for lining pipes and ducts are suggested, wherein a flexible tube is introduced in turning up manner into a pipe having respective openings at the pipe access end and the pipe terminal end. Here, prior to the turning up operation, a traction means is led through the flexible tube and the pipe and is secured to the flexible tube access end, wherein the flexible tube with the terminal end of the flexible tube is joined to the pipe access end and the traction means is automatically or distance-controlled pulled from the pipe access end by means of a motor winch. Here, the pipe by using turning up the flexible tube is lined therewith. The method is particularly suited for lining pipes and ducts having a plurality of pipe bends or angles.

33 Claims, 7 Drawing Sheets

METHOD FOR THE COATING OF SEWER PIPES INCLUDING APPARATUS FOR CARRYING OUT THE METHOD

The present invention relates to a method for lining pipes and ducts, wherein a flexible tube is introduced in turning inside out manner into a pipe having respective openings at the pipe access end and pipe terminal end as well as an apparatus for carrying out the same.

With well known methods which are carried out with apparatuses according to the prior art, here, before turning up operation a traction means is led through the flexible tube and the pipe and is secured to the flexible tube access end, the flexible tube having a flexible tube terminal end is joined to the pipe access end and the traction means is pulled from the pipe terminal end with a manually operated winch by an operator, wherein the pipe using the turning up operation of said flexible tube is lined therewith.

A disadvantage of the prior art is the high personnel effort, since in the regular case in addition to the personnel being situated at the pipe access end and, for example, watching a drum for the introduction of the flexible tube, personnel for pulling the traction means is required at the pipe terminal end as well. In addition, it is a problem to communicate between the personnel at the pipe access end and pipe terminal end, which has to be ensured by shout or walkie-talkies. Poor coordination between the personnel for pulling the traction means at the pipe terminal end and the personnel for controlled ceasing down and pressing in the flexible tube at the pipe access end can result in an impairement of installation safety of the flexible tube within the pipe. In particular, the installation safety could be limited with a highly wound and buckled pipe course, since particularly in these cases, high controlled pulling the traction means, which is adapted to the respective pipe curvature in order to enable a perfectly lining the pipe with flexible tube, without resulting for example a damage and a fracture of the traction means.

Starting from this prior art, it is the object of the present invention to provide a method for lining pipes and ducts and an apparatus for carrying out the same, which ensures a high installation safety of the flexible tube with low personnel effort and thus reduced cost.

This object is achieved with respect to the method by claims 1 and 2 as well as with respect to the apparatus by claims 13 and 14.

By respective automatic and distance-controlled pulling the flexible tube from the pipe terminal end, at this pipe terminal end personnel is absolutely not required. Having an automatic motor winch at the pipe terminal end such motor winch, for example, may operate with a characteristic curve (for the tension force or tractive speed) matched for the requirements of the pipe to be lined. Here, lining the pipe may take place based on a previously determined characteristic curve matched for pipe relations. Moreover, the automatic motor winch may be additionally equipped with measuring devices for the tractive force and tractive speed, respectively, and in accordance with these measurement results the automatic motor winch may pull said traction means with a respective tractive speed and tractive force, respectively. Here, for example with passing the pipe contractions and pipe bends, respectively, the tractive force is correspondingly, increased by the "turning up front" of the flexible tube to be lined.

With a remote controlled motor winch, said motor winch can be controlled for example from the region of the pipe access end by a single person that observes flexible tube ceasing down into the pipe access end such that matching problem introductorily described are avoided.

The winch according to the invention is not only limited to the application in pipes having circular cross-section but is also possible in ducts having a different cross-section such as an ellipsoidal cross-section. In addition, application is not limited to the pressurized turning up method explained above, automatic and remote controlled pulling a flexible tube is also enabled with such a motor winch.

Advantageous aspects of the present invention are described in the dependent claims.

A basic modification of the present invention provides for the flexible tube to be filled inside with adhesive such as epoxy resin prior to the turning up operation, the traction means to be led through the flexible tube and said pipe and to be secured to the flexible tube access end, the flexible tube having the flexible tube terminal end to be annularly and gastight joined to the pipe access end and a pressure medium to be led from the interior of the pipe upon the annularly fixed position of the flexible tube and the traction means to be automatically or distance-controlled pulled from the pipe terminal end. Here, introducing under pressure the flexible tube can advantageously be applied from a travelling pressure container in which interior the folded flexible tube is wound on a drum. With pulling the traction means according to the invention such as a flexible tube or a rope, the pressure for the turning up advance of the flexible tube inside the pipe can significantly reduced. This leads to a significant increase of the installation safety according to the invention.

A particularly advantageous aspect of the present invention provides a retaining means such as in form of a rope or belt extending in the opposite direction of the traction means to be existed at the flexible tube access end, wherein the other end of the retaining means is controlled maintained under tension and eased down in the surroundings of the pipe access end by a retainer, which for example is within said pressure container mentioned above, for controlling the speed of the lining operation. With this modification of the invention, a complete control of the flexible tube within the pipe is enabled, since both from the pipe access end and from the pipe terminal end the advance of the flexible tube can be controlled by means of the elongated pulling and retaining means, respectively.

Another advantageous aspect provides the traction means pulled out of the pipe terminal end to be wound on an exchangeable throw-away drum secured to the motor winch. During filling the flexible tube with adhesive prior to turning up a complete coverage of the traction means with adhesive results. Thus the wound traction means is also encompassed with adhesive. In order to save a lavish and expensive cleaning of the motor winch, it is hence advantageous to construct the drum of the motor winch as a throw-away winch to be simply joined (such as with a plug-type connection to be joined without any tool), which can be easily disposed after winding the traction means. Here, it is also advantageous for an excess adhesive to be stripped of the traction means and to be collected within drain off means provided thereto such as a collecting basin or outlet. Another advantageous development of the invention provides that a shaft-shaped deflection device is provided between the pipe terminal end and the winding means such as the throw-away drum, upon which the traction means slides down under deflection. It is ensured with it, having narrowed space relations in the region of the pipe terminal end, the traction means being led out of the pipe terminal end, is firstly deflected such that the motor winch has not to be mounted directly aligning toward the pipe terminal end. In addition, thus a particularly suitable position of the shaft of the take-up drum such as horizontally to the ground surface can always be realized.

A further particularly advantageous development of the invention provides the control of the motor winch to be achieved from the region of the pipe access end. This may occur such as by means of an operator control panel having displays of the tractive speed and tractive force of the motor winch, an accompanying monitoring of said motor winch is enabled such as by means of a video camera arranged in the region of the motor winch, wherein a monitor connected to said video camera is mounted in the region of the pipe access end for monitoring the motor winch. With occurring difficulties such as a slowing-down of the lining operation, the tractive force of the motor winch, for example, can be increased and lowered again with a defined characteristic curve by means of a switch inside the operator control panel.

Further advantageous developments of the present invention will be given in the remaining dependent claims.

In the following the present invention is explained according to several figures, in which.

Figure 1:
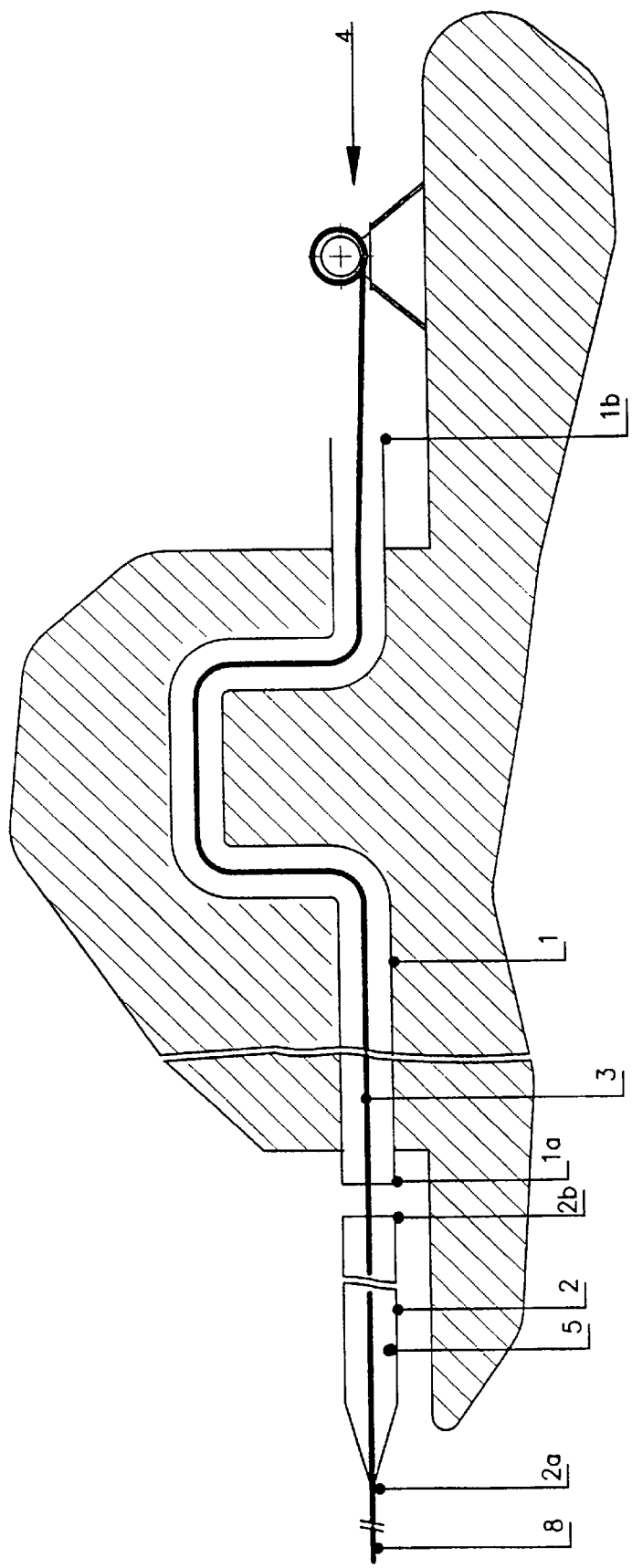
FIG. 1 shows a diagrammatic illustration of the pipe, flexible tube as well as the retaining and traction means.

FIG. 1 shows the flexible tube 2 having a flexible tube access end 2a and a flexible tube terminal end 2b as well as the pipe 1 being partly bent with a pipe access end 1a and a pipe terminal end 1b. The traction means 3 such as a rope or a belt, is led through the flexible tube 2 and being fixedly located to the flexible tube terminal end 2a. The traction means 3 can be constructed as a belt and may be formed of similiar material as the flexible tube 2, since it should be flat collapsibel along with the flexible tube 2 and is allowed to be rolled up upon a spool and drum 15, respectively (see FIG. 2a).

The traction belt 3 can be arranged such as with a projectile shaped needle into the flexible tube 2, with the rear portion of the needle has a slightly reduced cross-section and is connected to said traction belt. Then the needle is introduced inside the traction belt, wherein said traction belt is Compressed from outside at the rear portion of the needle by means of a pair of nip rollers and the needle within the traction belt is forwardly forced by transferring said nip rollers in the respective rotational movement. An adhesive may be deposited upon the inner surface of the traction belt such as by means of inclusion a great amount of adhesive at the one end of the lining and by squeezing between the nip rollers. The traction belt 3 is pressure sealed clamped at the flexible tube access end 2a such as by means of a suitable clamp, wherein the flexible tube access end 2a is pressure sealed strapped together.

A retaining means 8 such as a belt or rope as the traction means 3 is also clamped at the flexible tube access end 2a (traction means and retaining means may be configured from the same material and throughout). For example, the retaining means 8 and the flexible tube 2 starting with the retaining means 8 are rolled up upon the drum 15 (see FIG. 2a). The portion of the traction belt 3 protruding from the flexible tube 2 is at least as long as the whole pipe length from the pipe access end 1a to to the pipe terminal end 1b. This portion of the traction belt 3 may be blown such as by means of compressed air from the pipe access end 1a towards the pipe terminal end 1b and may be put there on the motor winch 4.

Figure 2A:
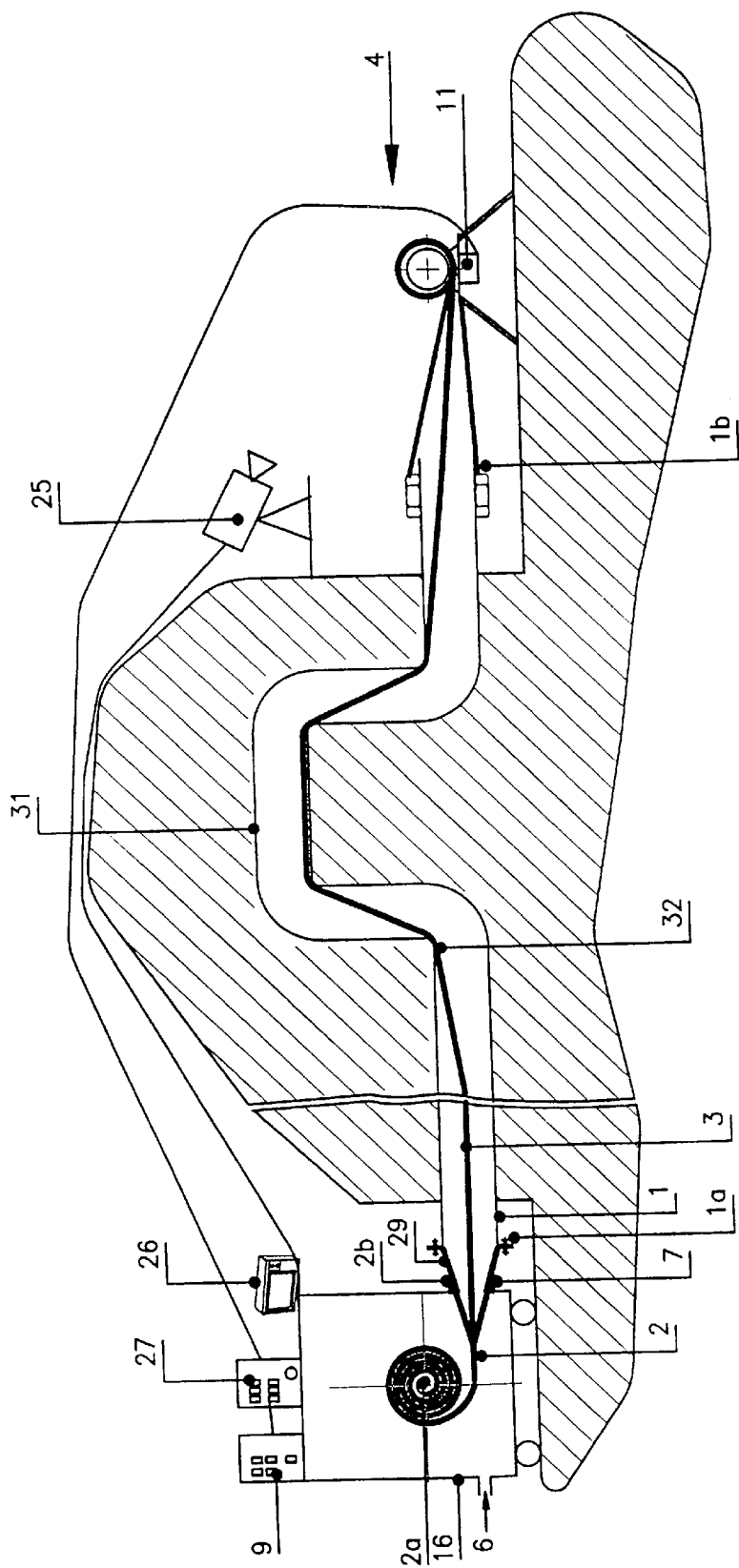
FIGS. 2a and 2b show two phases of lining a pipe with a flexible tube using application of a motor winch according to the invention.
Figure 2B:
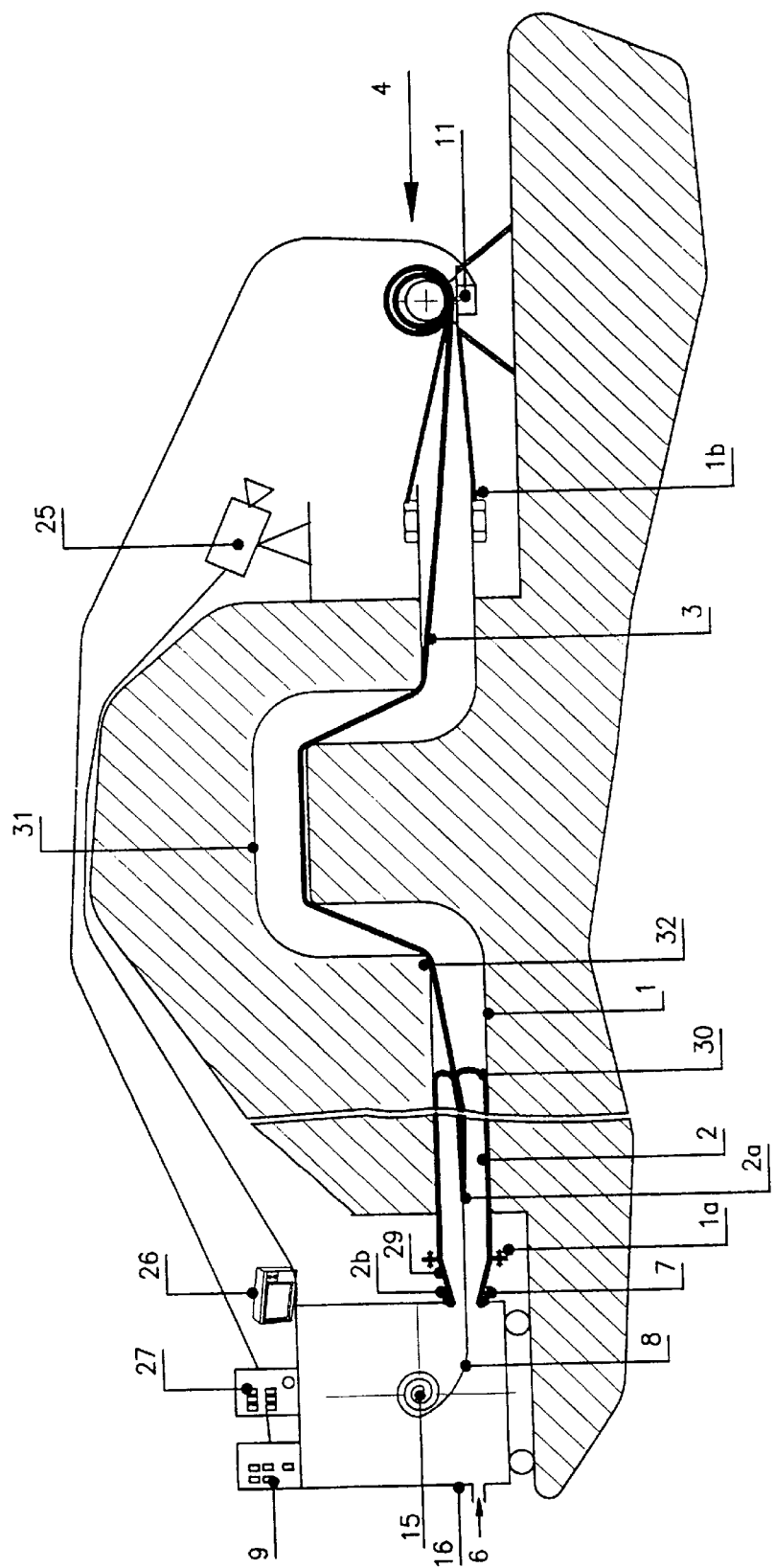

FIG. 2a shows an arrangement according to the invention at the begin of a lining operation. As previously described above, prior to the turning up operation, the turned up flexible tube is filled inside with adhesive, a traction belt is led through the flexible tube and the pipe and is secured to the flexible tube access end. In addition, a retaining belt 8 is arranged at the flexible tube access end, and the other end of the retaining belt is secured to the shaft of the rotary drum 15 and subsequently the retaining means 8 and flexible tube 2 are rolled up on the shaft of the drum 15. By means of a pressure sealed clamping device 29 the flexible tube terminal end 2b is secured pressure sealed to the pipe access end 1a. With this, the end of the flexible tube, which annularly embraces the pipe access end 1a, is plonked on the pipe access end 1a and a reducer, respectively, connected to the pipe access end. The drum 15 is located in the interior of a pressure sealed container 16, in which a pressure medium 6 can be introduced. By introducing a pressure medium 6 into the pressure container 16 pressure is applied on the annularly fixed position 7 of the flexible tube such that the flexible tube 2 turns inside out starting in the region of the clamping piece 29 and proceeds inside the pipe as shown in FIG. 2b.

Figure 3:
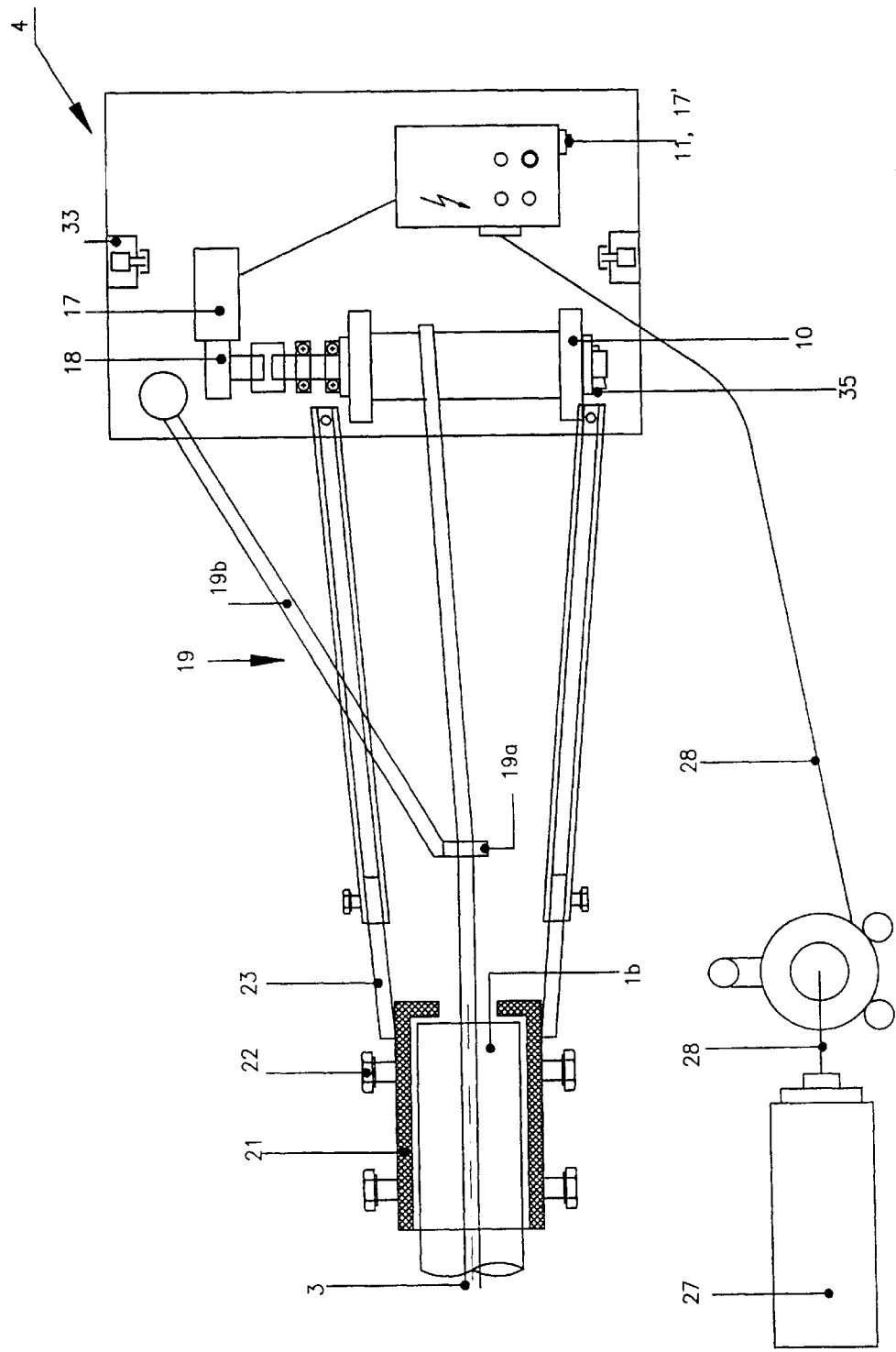
FIGS. 3 to 5 illustrate views of a motor winch according to the invention.
Figure 5:
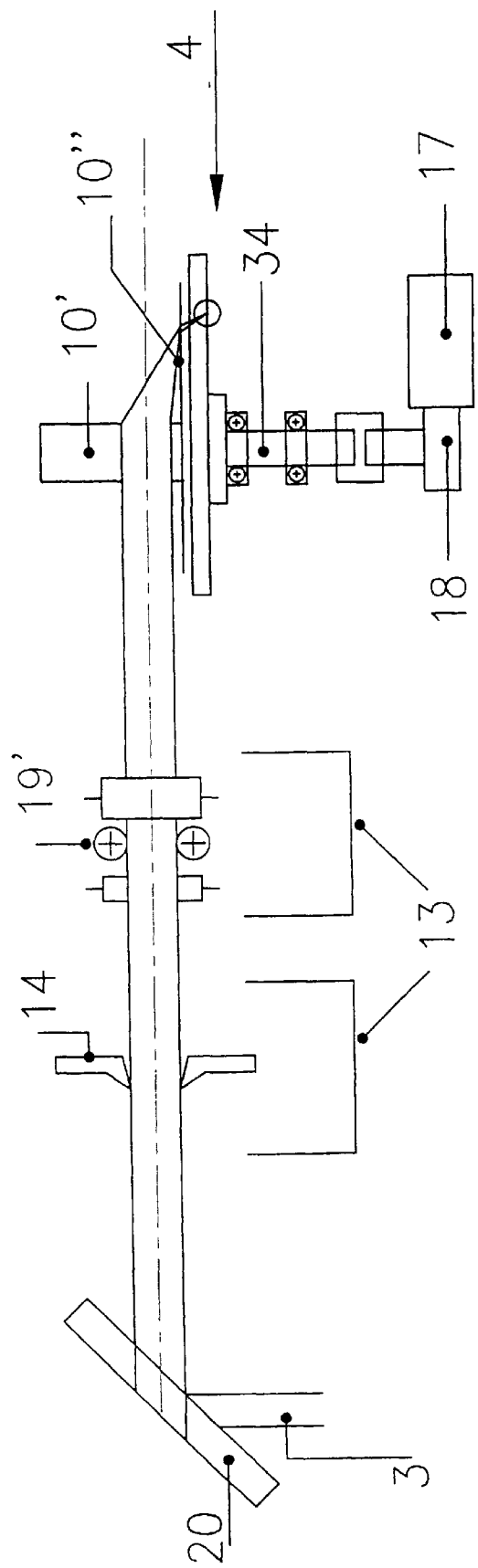

The advance of the flexible tube 2 and its turning up front 30, respectively, substantially occurs by introducing the pressure medium 6 into the pressure container and the inner space of the flexible tube gastight connected thereto (the flexible tube access end 2a is pressure sealed clamped), and is preferably supported with running through the pipe bends by the tractive force of the motor winch 4. The motor winch 4 is substantially stationary arranged within the region of the pipe terminal end 1b and comprises a control means 11 for automatic or distance-controlled controlling of the motor winch 4. In FIGS. 3 and 5 it will be gone into more detail of the motor winch, which winds the pulled traction belt 3 upon a drum. The control means 11 include a device for detecting the speed of the traction belt 3 in the region of the pipe terminal end 1b. Detection of speed can be carried out, here, with the rotational speed of the winding drum of the motor winch 4 or in other ways such as in an optical manner (using application of indicia on the traction belt 3). In addition, the control means and control device 11, respectively, comprises a device for detecting the tractive force F, by which the motor winch 4 pulls the traction belt out of the pipe terminal end 1b. Controllling the motor winch 4 can take place in various ways either automatically or distance-controlled. With an automatic control of the motor winch, characteristic curves previously determined, for example, can be set in advance by the control device 11, which depend on the pipe parameters determined prior to the lining operation. For example, thus the tractive force of the motor winch can be pre-determined on the traction belt 3 protruding from the pipe terminal end such that the tractive force decreases with an increasing proceeding of the turning up front 30 towards the pipe terminal end 1b. At the beginning of the lining operation, for example, the tractive force can amount to 200 N and merely 50 N at the end thereof. This decrease of the tractive force is the result of the traction belt to comprise friction with the pipe wall at more positions at the beginning of the lining operation than at the end thereof.

Friction is particularly increased in the region of curvatures 31, that is in interfaces 32 between the pipe wall and the traction belt 3. Obviously, it is also possible to predetermine a characteristic curve of the speed set in advance. Thus, for example, a winding speed and tractive speed of 4 to 12 meters per minute can be set in advance by the control device 11. This corresponds to a speed of the turning up front 30 of 2 to 6 meters per minute. This proceeding speed of the turning up front 30 is only half as high as the winding speed of the traction belt 3, since the flexible tube access end has merely to pass the pipe length in the same time interval, whereas the traction belt has to travel a double length (length of the flexible tube plus length of the pipe).

Besides fixed guidelines for the tractive force or tractive speed of the motor winch 4 the automatic control thereof by said control device 11 can also take place based on the values measured during the lining operation. Thus, for example the speed of the traction belt can be constantly measured, and with remaining under a limit speed, the tractive force of the motor winch can be continuously increased such that a pre-determined value for the speed adjusts. On the contrary, it is possible for the tractive force within the traction belt, for example, to be determined by a control device associated with a force measuring device and the speed of the traction belt 3 and the rotational speed respectively, of a take-up drum of said motor winch 2 is regulated in a manner, that a pre-determined characteristic curve of the tractive force is maintained.

With this automatic control, playing together of the traction belt 3 and retaining means 8 is substantially as well. The shaft of the rotary drum 15 provides a not shown drive as well as a not shown brake for controlling the rotational speed of the drum 15. This brake and drive are controlled by a retainer 9, which is regulated through an operator control panel received in the region of the pipe access end 1a.

The retainer of the drum 15 is connected to a control device of the motor winch 4. Here, the retainer controls the brake and drive of the drum such that the retaining means 8 is continuously under tension during the lining operation. As a result of connecting the retainer as well as the control means 11 to each other by means of lines for data transfer, the continuous control of the position of the flexible tube access end 2a is always enabled. This connection also permits, that both the retaining means and the traction belt are allowed to be maintained under tension and be eased and pulled in continuously controlled manner. With regular proceeding of the turning up front 30, hence ceasing the retaining means is always as much as the traction belt 3 is pulled by the motor winch 4. This comprehensive control appears for example such that with the relieve of tension within the traction belt 3, which is detected by the control device 11, either the rotational speed of the winch is increased or a respective signal is transmitted to the retainer, which is to increase the tension within the retaining means by actuating the brake of the shaft of the rotary drum 15 such that the tension within the traction belt 3 accordingly increases.

In place of the above described automatic control of the motor winch 4 and rotary drum 15, respectively, a manual control is also possible in accordance with display instruments. Control device 11 comprises an operator control panel 27 connected to cable 28. The operator control panel 27 which is considered in more detail further below comprises a display of the tractive force in the traction belt 3 as well as a display of the speed of the traction belt 3 and rotational speed of a take-up drum. Displaying the tractive force takes place in accordance with a tractive force measuring instrument disposed on the motor winch 4 and displaying the rotational speed takes place in accordance with a rotational speed measuring instrument of a driving motor disposed on the motor winch 4.

In an alternative aspect the operator control panel 27 is allowed to be connected to other members of the control device via radio link (in place of the cable 28). Thus, for example, operating the motor winch from the region of pipe access end 1a can continuously take place by means of the operator control panel 27. Hence, this operator control panel is constructed as a single-hand control such that the retainer 9 can be operated with another hand of an operator. In addition, camera 25 being directed upon the motor winch 4 is connected via cable to a monitor 26, which is received in the region of the pipe access end 1a. With this, complete monitoring the motor winch 4 beyond the monitoring by tractive force and speed displays of the operator control panel 27 is enabled.

FIG. 3 shows a detailed view of the motor winch 4. Motor winch 4 comprises a mounting plate 33, which is connected to the ground by supports being not shown. The height of the mounting plate 33 should be in the same height as the pipe terminal end 1b such that the traction belt 3 is allowed to run horizontally. With this, two sustainers being not shown, which can be clamped, are allowed to be raised from the mounting plate 33 to the mine floor. For greater heights telescopically extendible supports are to be provided.

A plastic spool 10 is disposed on the over-mounted shaft 34 of the motor winch. Prior to the lining operation, firstly a slot is sawn into the plastic spool 10 representing a take-up drum, traction belt is pulled through the slot and knotted up such that a tensile support of the traction belt on the plastic spool 10 is ensured. Preferably, the used traction belt has a width of approximately ⅓ to ⅔ of the diameter of the flexible tube and a height of 1 mm (this is also intended for the retaining belt). The over-mounted shaft 34 is connected to a gearing 18. This gearing comprises a forward running and an oppositely reverse motion, wherein with forward running the motor winch pulls the traction belt 3 out of the pipe 1. Gearing 18 is self-locking and connected to a direct current electric motor 17, which comprises a voltage supply 17'. The electric motor 17 is controlled by a control device 11 as previously mentioned above, which also includes an operator control panel 27. The traction belt pulled from the pipe terminal end 1b is pulled through a rectangular guide window 19a being in the plane perpendicularly to the longitudinal shaft of the traction belt, which is connected to the mounting plate 33 via a guide rod 19b. In front of the guide window 19a adjacent to the respective flat sides of the traction belt 3 rubber lips are disposed, which strip a part of the adhesive from the traction belt and allow to drain it off into a container not shown, which is disposed below. The guide 19 as well as the stripping device not shown serve to the adhesive poor and purposeful winding the traction belt 3 on the plastic spool 10.

The traction belt and the retaining belt are preferably formed of a smooth material, e.g. polyester and polyester silk, respectively, having thermally surface treatment. To minimize friction, the belt is particularly narrow braided and coated in case.

The use of a high slidable belt is particularly advantageous for some reasons with lining pipe bends. By virtue of a smooth belt surface, firstly friction between the belt and the pipe (such as at the interfaces 32) is minimized. In addition, "slitting" into the flexible tube material with a flexible tube damage resulting therefrom, such as it occurs with the use of ropes with lining of curvature regions, is prevented.

The plastic spool 10 is merely pinned up on the over-mounted shaft 34. The plastic spool 10 is pinned up to a stop member 34 of the over-mounted shaft 34 and is secured by means of a cotter pin. After lining the pipe, the traction belt 3 is cut through and the attachment of the traction belt at the flexible tube access end 1a is released, respectively, and the plastic spool 10, which has received the entire traction belt is pulled off from the over-mounted shaft 34 by releasing the cotter pin 35, and is disposed. Obviously, another fastening methods for the spool 10 are possible according to the prior art (such as snap-in connections), it is merely important for the plastic spool 10 to be easily exchangeable.

The mounting plate 33 is also connected to a pipe clip via telescopic arms 23. The pipe clip 21 is matched for the diameter of the pipe 1 to be lined and is pinned up thereon. Axial attachment takes place via screw handles 22 radially arranged, which are rotatable in the threaded through holes disposed in the circumferential direction of the pipe clip. With rotating the screw handles pressure is exerted upon the pipe terminal end 1b such that the pipe clip 21 is axially fixed on the pipe.

With the embodiment shown in FIG. 3, a pulser is disposed on the over-mounted supported shaft 34 which is associated with the control device 11 and measures the rotational speed as well as the rotational direction of the over-mounted supported shaft. Thus, with a known spool diameter the absolute speed of the traction belt 3 can be easily determined, as well. Alternatively, a direct determination of the translational speed of the traction belt 3 pulled from the pipe terminal end 1b such as by means of optical methods is enabled. The tractive force, by which the traction belt 3 is pulled out of the pipe 1 can be measured by means of force transducers determining the bar tension inside the supports 23. Alternatively, it is possible to determine the tractive force by the load of motor 17.

FIG. 5 shows a section from a further embodiment of a motor winch 4 according to the invention. Here, parts not shown are identical with the device from FIG. 3.

The traction belt 3 pulled out of the pipe terminal end 1b is led here via a shaft-shaped deflection device 20, wherein the traction belt is rectangularly deflected. The traction belt then travels two rubber lips 14 adjacent to the traction belt, which strip adhesive from the traction belt 3 and allow to drain it off into collecting basins and outlets, respectively. Past the stripping device the traction belt 3 travels a guide 19', which comprises two by two respective rectangularly disposed rolls, wherein the axes of the four rolls are perpendicularly disposed with respect to the longitudinal direction of the traction belt. Thereafter, the traction belt 3 is rolled up on a cardboard sleeve 10', which is disposed on an over-mounted shaft 34 being perpendicularly with respect to the earth's surface. To avoid pollutions of the drive unit (electric motor 17, gearing 18) disposed below the cardboard sleeve 10', a plate-like paper rest 10' is arranged.

The motor winch is configured such that the length of the traction belt to be wound is 60 m on average (however, significantly greater lengths of the traction belt are also possible). During the winding operation, the winch pulls at the traction belt with an adjustable force of mostly 50 to 300 N (on the average 100 N). At the beginning of lining hence the winch has to operate with a higher tractive force, in order to overcome the increased friction by the contact of the traction belt with the inner pipe wall, which particularly increasingly occurs inside the pipe bends. When the turning up front 30 of the flexible tube 2 reaches a pipe bend, the tractive force of the winch has to be momentarily increased up to 500 to 1000N, in order to overcome the increased friction and turning up forces, respectively. However, it is to be considered, that these high tractive forces are only applied momentarily and with a defined increase as well as a defined decrease since the rapture limit of the traction belt is indeed significantly above 1000N, however the tension strength can be influenced by chafing the traction belt inside the pipe bends.

Figure 6:
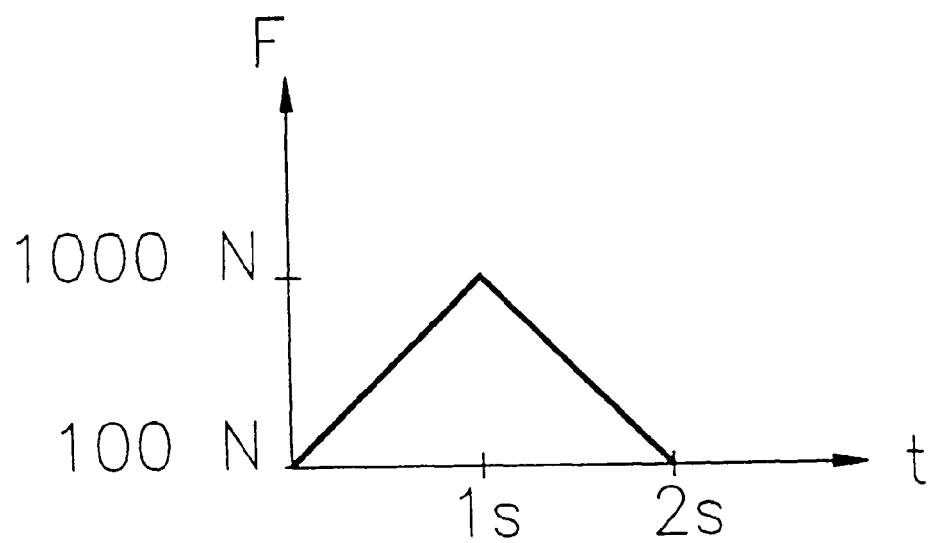
FIG. 6 shows a characteristic curve of a momentary increase of the tractive force of a motor winch according to the invention.

FIG. 6 shows a graph for momentarily increasing the tractive force as can be manually triggered by a circuit breaker on the operator control panel 27. Within one second, hence the tractive force of the motor winch 4 is constantly increased from 100N to 1000N, and is reduced within another second from 1000N to 100N. Gradually increasing and decreasing the tractive force, on the one hand, ensures a careful treatment of the traction belt and, on the other hand, safe travelling of the turning up front 30 through the pipe bends.

In addition, the flexible tube access end 2a can get jammed at the reducing fitting and the pipe access end 1a (i.e. in the region of the "inversion head"). When approximately half of the flexible tube 2 is travelled inside the pipe 1 to be redeveloped the connection position of the flexible tube 2 and traction belt 3 leaves the pressure container. With this, a standstill of the flexible tube may result at the narrow location. In such a case, momentary manual increasing the tractive force is to be performed according to FIG. 6.

Another interfering possibility is in that the traction belt 3 get jammed by the flexible tube, that is, passing between the flexible tube and pipe wall. This particularly happens when the traction speed of the motor winch 4 is too low. Such a jamming is apparent in that the motor winch does not rotate although the flexible tube 2 still further penetrates into the pipe (this is apparent with rotating of the drum 15). In this case, the rotational direction of the drum 15 is to be inverted by means of the retainer 9 such that the flexible tube is partly pulled back into the pressure container 16. with releasing the jammed traction belt an increase of the tractive force of the traction belt 3 results towards the pipe access end 1a. This tractive force increase is detected by a sensor associated with the control device 11 and displayed to the operator on the operator control panel 27. Subsequently, the drum 15 is automatically and manually stopped, respectively, by the operator and the normal lining operation can be continued as described above.

A completion of the lining operation takes place with a switch off device which is not illustrated in more detail. This includes a switch off sensor disposed within the region of the pipe terminal end, which detects the flexible tube escaping from the pipe terminal end. This switch off sensor may be constructed as a light barrier or mechanical switch (during pipe escaping the flexible tube pushes against the mechanical switch). The switch off sensor gives a signal to the retainer which stops the drum 15. Alternatively to the automatic completion an alert on the operator control panel 27 is possible for a later manual completion.

Figure 4:
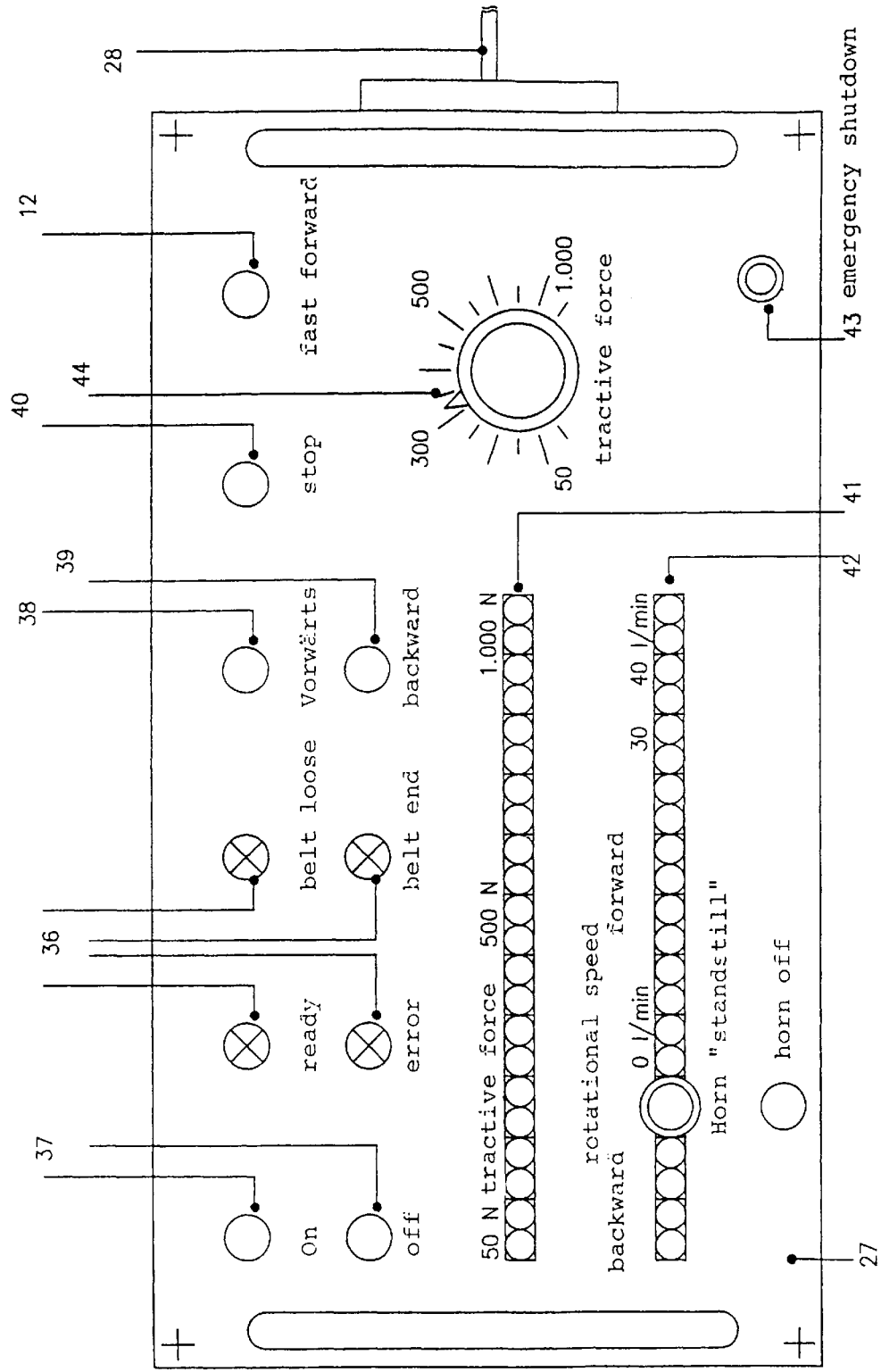

FIG. 4 shows a detailed view of the operator control panel 27 for controlling and monitoring the operations as described above. This comprises a circuit closer and circuit breaker 37, lamps for displaying the present operation mode (Ready, Belt loose, Error, Belt end), a switch "Forward" 38 for pulling the traction belt out of the pipe terminal end 1b, a switch "Rearward" 39 for ceasing the traction belt 3 into the pipe, a switch "STOP" 40 for stopping the operation of the motor winch 4 as well as a switch "Forward fast" 12 for momentary manual increase the tractive force as shown in FIG. 6. The operator control panel further comprises a rotary potentiometer 44 for adjusting the tractive force of the traction belt 3 (range of tractive force from 50 to 1000N). A respective tractive force display, which displays tractive forces of 50N to 1000N in a logarithmic manner by means of different coloured light emitting diodes, is indicated with numeral 41. A corresponding luminuous band composed of LED-diodes is provided for the rotational speed as well (reference numeral 42), wherein the left four LED-diodes indicate rearward oriented rotational speeds. In addition, the operator control panel 27 comprises an "Emergency Off Switch" 43. It turned out, that the display of the tractive force and speed, respectively (rotational speed of the traction belt 3) preferably takes place by means of these luminuous bands, since they permit a faster detection of the importance of measured values by the operating personnel than alphanumeric displays enable.

We claim:

1. A method for lining pipes and ducts, wherein a flexible tube (2) is introduced in a turning inside out manner into a pipe (1) having respective openings at the pipe access end (1a) and pipe terminal end (1b), wherein prior to the turning up operation a traction means (3) is led through said flexible tube (2) and said pipe (1) and is secured to the flexible tube access end (2a), said flexible tube (2) having a flexible tube terminal end (2b) is joined to the pipe access end (1a) and said traction means (3) is automatically or distance-controlled pulled from said pipe terminal end (1b) by means of a motor winch (4), wherein by using said turning up operation said flexible tube (2), said pipe (1) is lined therewith.

2. A method for lining pipes and ducts, in which said flexible tube (2) is introduced in turning up manner into said pipe (1) having respective openings at said pipe access end (1a) and said pipe terminal end (1b), wherein prior to turning up operation said flexible tube (2) is filled inside with an adhesive (5), said traction means (3) is led through said flexible tube (2) and said pipe (1) and is secured to said flexible tube access end (2a), said flexible tube (2) having said flexible tube terminal end (2b) is annularly and gastight joined to said pipe access end (1a) and from the exterior of the pipe, a pressure medium (6) is led on the annularly fixed position (7) of the said flexible tube (2) and the traction means (3) is automatically or distance-controlled pulled from said pipe terminal end (2b) with a motor winch in supporting manner, wherein said pipe (1) by using turning up said flexible tube (2) is lined therewith.

3. A method according to claim 2, wherein prior to the lining operation additionally a retaining means (8) being pressure sealed and clamping the flexible tube access end (2a) is arranged, which the other end thereof in the surroundings of said pipe access end (1a) is maintained under controlled tension by a retainer (9) for controlling the speed of the lining operation and is eased down.

4. A method according to claim 1 or 2, wherein prior to turning up said flexible tube (2) the traction means (3) is forced into said pipe by means of compressed air.

5. A method according to claim 1 or 2, wherein the traction means (3) pulled out of said pipe terminal end (1b) is wound on an exchangeable throw-away drum (10, 10') secured to said motor winch (4).

6. A method according to claim 1 or 2, wherein in the region of said pipe terminal end (1b) the speed and tension force inside the traction means (3) is determined by a speed and force measuring instrument.

7. A method according to claim 1 or 2, wherein the tension force of said motor winch (4) decreases at said traction means (3) protruding from said pipe terminal end (1b) with increasing pipe lining.

8. A method according to claim 1 or 2, wherein in the region of the pipe terminal end (1b) the tension force within the traction means (3) is determined by a force measuring instrument and the speed is regulated such that a predetermined characteristic curve of the tension force is maintained.

9. A method according to claim 1 or 2, wherein in the region of the pipe terminal end (1b) the speed of the traction means (3) is determined by a speed measuring instrument and the tension force is regulated such that a predetermined characteristic curve of the speed is maintained.

10. A method according to claim 1 or 2, wherein the tension force may be momentarily increased with defined characteristic curve by a switch (12) being manually actuated.

11. A method according to claim 2, wherein prior to the turning up operation additionally a retaining means (8) is arranged to said flexible tube access end (2a), which the other end thereof in the surroundings of the pipe access end is maintained under tension and eased down by a retainer device (9) for controlling the speed of the lining operation, and for data exchange the retainer device (9) is connected to a control means (11) for controlling and actuating the motor winch (4).

12. A method according to claim 2, wherein adhesive residues are stripped from the traction means (3) being pulled out of the pipe terminal end (1b) and collected in a collecting container (13).

13. A method for lining pipes and ducts, wherein a flexible tube (2) is introduced in turning up manner into a pipe (1) having respective openings at the pipe access end (1a) and the pipe terminal end (1b), including:

means for leading a traction means (3) through said flexible tube (2) and through said pipe (1), means for securing said traction means (3) at the flexible tube access end (2a), means for securing the flexible tube terminal end (2b) of said flexible tube to the pipe access end (1a) and a motor winch (4) having control means (11), which is disposed in the region of said pipe terminal end (1b), wherein said motor winch supportingly pulls said traction means (3) in accordance with said control means for lining the pipe with said flexible tube in turning up manner.

14. An apparatus for lining pipes and ducts, wherein a flexible tube (2) is introduced in turning up manner into said pipe (1) having respective openings at the pipe access end (1a) and the pipe terminal end (1b), including:

means for leading a traction means (3) through said flexible tube (2) and through said pipe (1), means for providing the inner wall of the flexible tube being not turned up with adhesive (5), means for securing said traction means (3) to said flexible tube access end (2a), means for annularly and gastight enclosing securing said flexible tube terminal end (2b) of the flexible tube at the pipe access end (1a), means for introducing a pressure medium (6) from the exterior of the pipe upon said annularly fixed position (7) of said flexible tube (2) and a motor winch (4) having control means (11), which is disposed in the region of the pipe terminal end, wherein said pipe (1) is lined with said flexible tube (2) by introducing said pressure medium (6) turning up said flexible tube (2), and said motor winch (4) pulls said traction means in accordance with the control means (11).

15. An apparatus according to claim 14, wherein said motor winch (4) comprises a stripping means (14) for said adhesive (5) sticking at said traction means (3) as well as collecting means (13) being below said stripping means.

16. An apparatus according to claim 14, wherein a retaining means (8) secured to the flexible tube access end (2a) is additionally provided, which is pulled or eased down by a retainer (9) being in the region of said pipe access end (1a).

17. An apparatus according to claim 14, wherein a retaining means (8) secured to the flexible tube access end is additionally provided, which is pulled or eased down by a retainer (9) being in the region of the pipe access end, wherein said retaining means (8) and said flexible tube (2) are wound on a drum (15) inside a pressure container (16).

18. An apparatus according to claim 13 or 14, in which said motor winch (4) includes an electric motor (17) with power supply (17'), a gearing (18) mounted to said electric motor (18), winding means (10, 10') connected to said gearing for winding up said traction means (3) as well as a guidance (19, 19') for guiding and purposeful depositing said traction means (3) on said winding means (10, 10').

19. An apparatus according to claim 13 or 14, in which said motor winch (4) includes a shaft-shaped deflection device (20) existing between said pipe terminal end (1b) and a winding means (10, 10') of said motor winch, on which said traction means (3) slides down under deflection.

20. An apparatus according to claim 13 or 14, in which a drum (10, 10') for winding said traction means is connected to said motor winch by means of plug-type, split-pin or snap connections to be joined and separated without any tools.

21. An apparatus according to claim 13 or 14, in which said motor winch (4) comprises a couple means (21, 22, 23) for maintaining the defined clearance between said motor winch (4) and pipe terminal end (1b).

22. An apparatus according to claim 13 or 14, in which said motor winch comprises a gearing (18) having a forward motion and an oppositely running reverse motion, wherein in the forward motion said motor winch pulls said traction means (3) out of said pipe (1).

23. An apparatus according to claim 13 or 14, in which said control means (11) is an automatic control, wherein according to a stationary predetermined characteristic curve the control regulates the speed or the force of said traction means (3) being pulled from said motor winch (4), or regulates depending on speed or tension values measured by said control means (11).

24. An apparatus according to claim 13 or 14, in which said control means (11) includes an operator control panel (27) connected via cable to said motor winch (4).

25. An apparatus according to claim 13 or 14, in which said control means (11) includes an operator control panel (27) connected by radio to said motor winch (4).

26. An apparatus according to claim 13 or 14, in which said control means (11) comprises a video camera arranged in the region of said motor winch (4) as well as a monitor connected to said video camera (25) for controlling said motor winch (4).

27. An apparatus according to claim 13 or 14, in which said control means (11) comprises a measuring instrument as well as a measuring display and a manual regulating device for the tension force existing within said traction means.

28. An apparatus according to claim 13 or 14, in which said control means (11) comprises a measuring instrument as well as a measuring display and a manual regulating device for the tractive speed of said traction means within the region of the pipe terminal end.

29. An apparatus according to claim 13 or 14, in which said control means (11) comprises a measuring device as well as a measuring display and a manual regulating device for the rotational speed of a drum driven by said motor winch for winding said traction means pulled by said motor winch.

30. An apparatus according to claim 13 or 14, in which said traction means is a belt having a width in the range of $\frac{1}{3}$ to $\frac{2}{3}$ of the diameter of the flexible tube.

31. An apparatus according to claim 13 or 14, in which said traction means is a belt of polyester having thermally surface treatment.

32. An apparatus according to claim 14, in which additionally a retaining means (8) secured to the flexible tube access end is provided, which is pulled or eased down by a retainer (9) being in the region of the pipe access end, wherein said retaining means (8) and said flexible tube (2) are wound on a drum (15) inside a pressure container (16) and said retaining means is a belt, which has a width in the range of $\frac{1}{3}$ to $\frac{2}{3}$ of the flexible tube diameter and being of polyester having thermally surface treatment.

33. An apparatus according to claim 13 or 14, in which said control means additionally includes a switch off sensor, which sensor detects escaping of the flexible tube from said pipe terminal end and outputs a switch off signal to finish the lining operation.

* * * * *